US006981070B1

(12) United States Patent
Luk et al.

(10) Patent No.: US 6,981,070 B1
(45) Date of Patent: Dec. 27, 2005

(54) NETWORK STORAGE DEVICE HAVING SOLID-STATE NON-VOLATILE MEMORY

(76) Inventors: Shun Hang Luk, 7944 Pineville Cir., Castro Valley, CA (US) 94552; Rey H. Bruce, 175 Clayton Ave., San Jose, CA (US) 95110; Ricardo H. Bruce, 33041 Regents Blvd., Union City, CA (US) 94539; Dave L. Bultman, 48480 Avalon Heights Ter., Fremont, CA (US) 94539

( * ) Notice: Subject to any disclaimer, the term of this patent is extended or adjusted under 35 U.S.C. 154(b) by 552 days.

(21) Appl. No.: 09/900,720

(22) Filed: Jul. 6, 2001

Related U.S. Application Data

(60) Provisional application No. 60/217,541, filed on Jul. 12, 2000.

(51) Int. Cl.[7] ............................................. G06F 13/00
(52) U.S. Cl. ........................... 710/5; 710/33; 711/100; 709/250; 707/200
(58) Field of Search ........................ 710/1, 5–7, 32–42, 710/62–74; 709/213–216, 250; 707/200; 711/207, 100–146

(56) References Cited

U.S. PATENT DOCUMENTS

| | | | | |
|---|---|---|---|---|
| 5,420,991 A | * | 5/1995 | Konigsfeld et al. | ......... 711/150 |
| 5,835,955 A | * | 11/1998 | Dornier et al. | ............. 711/162 |
| 5,848,251 A | * | 12/1998 | Lomelino et al. | ........... 710/305 |
| 5,941,972 A | * | 8/1999 | Hoese et al. | ................. 710/315 |
| 6,035,384 A | * | 3/2000 | Tuma et al. | ................. 711/219 |
| 6,038,641 A | * | 3/2000 | Zangenehpour | ............. 711/119 |
| 6,202,090 B1 | * | 3/2001 | Simone | ....................... 709/220 |
| 6,338,115 B1 | * | 1/2002 | Galbraith et al. | ........... 711/113 |
| 6,421,753 B1 | * | 7/2002 | Hoese et al. | ................. 710/305 |
| 6,598,174 B1 | * | 7/2003 | Parks et al. | ..................... 714/6 |
| 6,609,177 B1 | * | 8/2003 | Schlumberger et al. | ...... 711/122 |

* cited by examiner

*Primary Examiner*—Christopher Shin
(74) *Attorney, Agent, or Firm*—Shabneez Kotadia; Stephen Uriarte

(57) ABSTRACT

A network storage device. In one embodiment, the network storage device of the present invention uses solid-state non-volatile memory (e.g., flash-memory) as a storage medium, and has at least one interface configured for coupling to a computer network. The network storage device of the present invention is accessible to client(s) and/or server(s) of the computer network, and uses solid-state non-volatile memory to store data received therefrom. The network storage device may also be configured to include a memory for caching data to be written to the solid-state non-volatile memory. In order to provide additional storage, the network storage device may also include a peripheral interface or another network interface for coupling to a mass storage device (e.g., a RAID system), and/or another network interface for coupling to a network of mass storage devices. The network storage device may be a stand-alone unit, or may be implemented as part of a network server, or as part of a mass storage device.

5 Claims, 5 Drawing Sheets

NETWORK STORAGE DEVICE HAVING SOLID-STATE NON-VOLATILE MEMORY

This application claims benefit of 60/217,541 filed Jul. 12, 2000.

FIELD OF THE INVENTION

The present invention generally pertains to the field of storage devices. More specifically, the present invention pertains to storage devices that may be used in a class of network storage systems, commonly referred to as network-attached storage and storage area networks.

BACKGROUND OF THE INVENTION

The explosive growth of networked computer systems and the large volume of data generated by companies and individuals has created a need for a storage model that can support the bandwidth used and transfer rate required by modern day computers and computer networks, and that can scale to support future increases in storage capacity. This need has stressed the capabilities of the traditional storage server model and has promoted the use of storage area network architectures, such as SAN (Storage Area Network) and NAS (Networked-Attached Storage).

SAN and NAS devices offer large bandwidth, scalability, and increased data management capabilities when compared to traditional storage servers. However, like traditional storage servers, they use at least one disk drive for mass storage. Disk drive technology offers large capacity and low expense but has positioning and data transfer characteristics that make improving the performance of disk drives relatively expensive.

A disk drive is an electromechanical storage device that can either write to or read data from at least one rotating disk, commonly referred to as a platter, in response to an instruction received from a host. In addition, it includes an interface for receiving read or write instructions and associated data from the host and for transmitting the data and appropriate control signals to a platter across a communications channel.

A disk drive write or read operation requires a transfer and a positioning step. The transfer step includes using the communications channel to transfer read data from the platter to the interface, or to transfer write data from the interface to the platter. The transfer step is electrical in nature and does not involve any mechanical movement to perform. Unlike the transfer step, the positioning step includes reading or writing data from at least one physical location on the platter and requires mechanical means to move the read/write head to the proper track and to rotate the spindle containing the track to the proper sector. Both of these steps affect the performance of a particular disk drive and are potential bottlenecks to disk drive performance, which in turn greatly affect the performance of a host that sends a data command to a NAS or SAN device using the disk drive. Current disk drives are capable of performing read or write operations in the high single to low double-digit millisecond range, which is relatively slow compared to the performance of existing computers and computer networks.

For example, computer networks exist that can transmit at rates over one gigabit per second (Gb/s), which can support the transfer of over 200 megabytes per second (MB/s) in full-duplex mode. A host or an equivalent device having a 200 MHz pipelined processor can theoretically execute 200,000 instructions per millisecond and have system memory having a data rate in the nanosecond range. Consequently, since disk drive performance is dependent on its positioning and transfer performance, they are important factors in any storage device that uses disk drive technology. An improvement in these factors can greatly reduce idle time and/or increase processing capacity and thereby, increase system or host performance that relies on such a storage device.

One approach to improving storage device performance is by using DRAM as a storage medium rather than rotating disks or platters. DRAM is a form of memory commonly referred to as volatile memory, which does not suffer from positional latencies that afflict all electromechanical disk drives. Consequently, a read or write to solid-state volatile memory takes less time to perform than when using a disk drive.

However, DRAM (or its equivalents) has certain disadvantages. DRAM must constantly be refreshed and thus, requires a constant source of power to retain data stored within it. If power to DRAM is lost, any data stored within it is lost or corrupted. One solution is to use an uninterruptible power supply (UPS). This permits the UPS to maintain data in the DRAM until primary power is restored.

Since the data storage capacity for DRAM based storage devices may be in the gigabyte range a considerable amount of back-up power is needed. An uninterruptible power supply uses batteries as standby power and thus, has only a limited amount of power that is available to maintain data in DRAM. Should the standby power be exhausted before primary power is restored, then all data in the DRAM will be lost. Hence, improved solutions include using at least one disk drive as a back-up storage medium. This permits data in DRAM to be transferred and stored in the disk drive, which is a process called flushing.

However, such solutions are large and unwieldy because the UPS must not only provide enough standby power to refresh the data in volatile memory but it must also have enough standby power to keep the disk drive operating while data is being flushed from DRAM to the disk drive. Consequently, for a battery-based UPS, a high-capacity battery is required, which typically means a large lead-acid battery.

Moreover, for large capacity DRAM-base storage devices, flushing can take several minutes to perform, which is another disadvantage. For storage devices having DRAM storage capabilities in the 1 to 10 Gigabyte range, it can take several minutes to over an hour to flush, depending on the average sustained transfer rate from DRAM to the back-up disk drive, and the back-up disk drive's file structure, cluster size, fragmentation, and partitioning characteristics. This time requirement can exceed the capabilities of many UPS systems since many are battery powered and will eventually fail if downtime power demands exceed their battery capacity. Thus, such systems also do not scale very well.

The delay in flushing a large cache has an additional disadvantage as well. Each time the storage device needs to be brought off-line and turned off, its cache must first be flushed, consuming a significant amount of time as described above before being available for maintenance. As a result, operational downtime for that storage device is increased. If the storage device is one of many, then operational capacity provided by the group of devices is decreased until the storage device is completed flushed and swapped with another storage device.

Accordingly, a need exists for an improved storage device that minimizes the above disadvantages. In addition, a need exists for an improved storage device that is network addressable and that has an embedded file system. Further, a need exists for an improved storage device that is can be used in Fibre Channel network, commonly referred to as a Storage Area Network.

SUMMARY OF THE DISCLOSURE

Accordingly, the present invention provides a network storage device having a solid-state non-volatile memory as a storage medium. Access time of solid-state non-volatile memory is significantly better than that of disk drives. Thus, by using solid-state non-volatile memory as a storage medium, the internal data transfer rate latency associated with electromechanical disk drives is eliminated. Moreover, because solid-state non-volatile memory consumes little power and current when written to, sufficient power for flushing solid-state volatile memory can be provided using a power source comprised of capacitors rather than lead acid batteries typically found in uninterruptible power supplies. This permits network storage device to be offered with an embedded auxiliary power source, while retaining a drive form factor that is commonly found in stand-alone disk drives, such as disk drives offered in a three and half inch form factor.

In one embodiment, the network storage device has at least one interface configured for coupling to a computer network. Client(s) and/or server(s), commonly referred to as hosts, that are coupled to the computer network can read data from or write data to the network storage device using I/O requests, such as file system calls, sent to the network storage device. To provide additional storage, the network storage device of the present embodiment may include a peripheral interface or another network interface for coupling to at least one mass storage device, such as a disk drive. The network storage device of the present embodiment has the form-factor of a common disk drive, enabling the device to be conveniently deployed within a local area network or a wide area network. The network storage device may be a stand-alone unit, or may be implemented as part of a network server, and/or may be implemented as part of a mass storage device.

Yet another embodiment of the present invention provides a network storage device that includes one interface configured for coupling to a storage area network, and another interface configured for coupling to at least one mass storage device, such as a disk drive. The storage area network may be a Fibre Channel storage area network that includes a network of Fibre Channel storage devices. In this embodiment, the storage device also uses solid-state non-volatile memory (e.g., flash-memory) as a storage medium, and allows Fibre Channel hosts attached to the storage area network to retrieve data from and write data to the non-volatile memory. The Fibre Channel hosts also allow hosts coupled to the Fibre Channel hosts via a computer network to retrieve data from and write data to network storage devices that are coupled to the storage area network.

In order to provide large I/O throughput and low access latency, the network storage device of one embodiment preferably includes a volatile memory for caching frequently accessed data of the solid-state non-volatile memory. Particularly, the network storage device may include a controller that processes requests received and that accesses the cache memory, the non-volatile memory or any mass storage device attached thereto to retrieve and store data depending on where the requested data is located and where the data is to be stored.

Embodiments of the present invention include the above and further include a network storage device that has a network interface configured for coupling to the computer network, a controller coupled to the network interface and configured for receiving I/O requests and associated data from the computer network, and a solid-state non-volatile memory coupled to the controller and coupled to the network interface wherein the solid-state non-volatile memory is configured for storing the data.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures, devices, methodologies, etc., are not described in detail in order to avoid obscuring aspects of the present invention.

Figure 1:
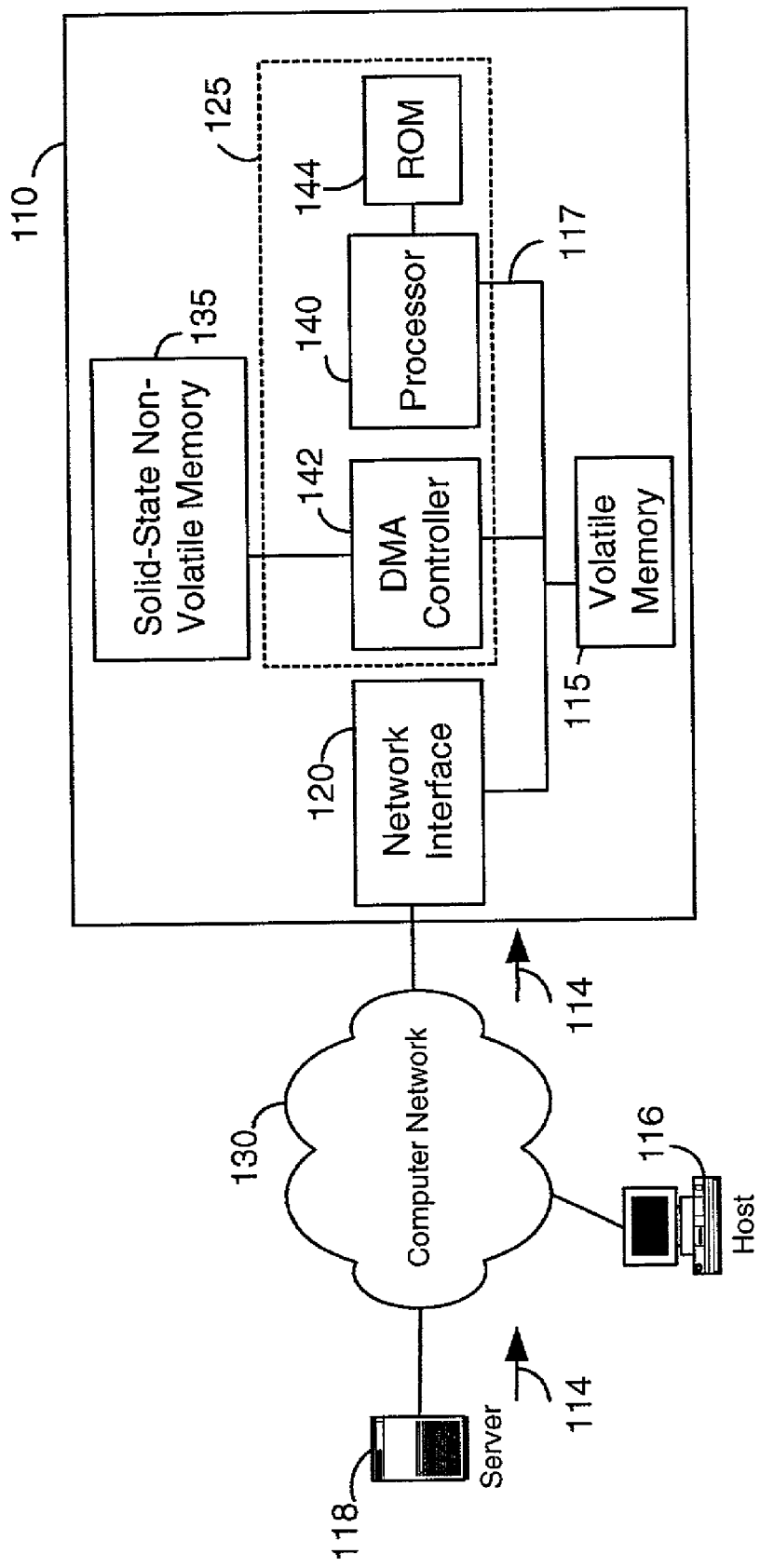
FIG. 1 is a block diagram of a network storage device having non-volatile memory as mass storage in accordance with one embodiment of the present invention.

FIG. 1 is a block diagram illustration of a network storage device 110 having solid-state non-volatile memory 135 in accordance with one embodiment of the present invention. Storage device 110 also includes a data path 117, a controller 125, a network interface 120, and a volatile memory 115, which operate cooperatively to enable storage device 110 to function as a network-addressable storage device. Specifically, any device, such as host 116 or server 118, that is coupled to computer network 130, that runs software that supports the network protocols defined for computer network 130, and that uses a file access protocol supported by storage device 110, can perform file-level I/O requests ("file system calls") using storage device 110, such as writing or reading data files. Host 116 or server 118 that sends the file system call does not have to be coupled directly to computer network 130 but may be coupled through other networks (not shown) that are ultimately coupled to computer network 130.

The term computer network as used herein may include local area networks (LANs), wide area networks (WANs), or any network covering a large geographical area, such as the Internet, that permit attached hosts to send I/O requests, such as file system calls, to network storage devices or storage servers. Some of the most popular types of networks are Ethernet (coaxial cable or twisted-pair cable), Token Ring, Fiber Distributed Data Interface (FDDI), Frame Relay, Integrated Services Digital Network (ISDN), X.25, and Synchronous Data Link Control (SDLC), etc. It should be appreciated that the present invention may be practiced with other types of networks and topologies as well.

Network interface 120 receives file system calls 114 or transmits responses to same in the form of network data packets across computer network 130. For example, if network interface 120 receives a set of data packets encapsulating a file system call in the form of a file-level read request, it transmits the read request to controller 125 across data path 117 after obtaining the read request from the network data packets received. Controller 125 is configured to function as an embedded file system and memory controller for solid-state non-volatile memory 135, which is used as mass storage, and volatile memory 115, which is used as a cache. Upon receiving the read request, controller 125 translates the read request into hardware specific tasks so that the appropriate file is read from volatile memory 115, if a cache hit occurs. If so, the requested data is retrieved from volatile memory 115 and sent to the device that sent the read request via data path 117, network interface 120 and computer network 130. If a cache miss occurs, then controller 125 performs a read request from solid-state non-volatile memory 135, updates cache 115, and sends the data to the requesting device through the path just described above. If a device transmits a file system call in the form of a write request and addresses the file system call to storage device 110, then upon receiving the write request from network interface 120, controller 125 writes the data in volatile memory 115. Controller 125 will subsequently write the data to solid-state non-volatile memory 135.

Controller 125 includes a processor 140, a Direct Memory Access (DMA) controller (DMC) 142, and a ROM ("Read-Only Memory") 144. Processor 140 is coupled to data path 117 and to ROM 144. DMA controller 142 is coupled to data path 117 and to solid-state non-volatile memory 135. In the current embodiment of the present invention, processor 140 is a PowerPC™ 803 processor, which is commercially available from IBM Corporation of Poughkeepsie, N.Y., and DMA controller 142 includes at least one DMA (Direct Memory Access) controller suitable for supporting memory operations on solid-state non-volatile memory 135, such as flash memory. DMA controller 142 is commercially available from BiTMICRO NETWORKS, Incorporated of Fremont, Calif.

ROM 144 stores codes and instructions for causing the microprocessor to execute functions associated with file system calls, such as those commonly associated with the NFS (network file system) or CIFS (common internet file system) protocol, or both. This enables controller 125 to provide file system functionality to storage device 110. Those of ordinary skill in the art will readily recognize that the implementation described for controller 125 is not intended to be limiting in any way. Other implementations may be used to support the file system functions described herein.

Data path 117 may be a bus, embedded network, or equivalent that will permit components coupled to it to communicate with each other. Data path 117 is a bus compliant with the PCI (Peripheral Component Interconnect), version 2.1 standard although this is not intended to be limiting in any way. Network interface 120 may be implemented using any network interface that can send or receive commands and/or data across computer network 130 and that can communicate with controller 125 through data path 117. For example, if computer network 130 is an Ethernet network and data path 117 is a PCI compliant bus, network interface 120 may be implemented using an Ethernet network interface having a PCI interconnect. Although Ethernet networks, Ethernet network interfaces, and the PCI (Peripheral Component Interconnect) standard are commonly known to those of ordinary skill in the art, other equivalent types of networks, network interfaces, and data paths may be used without departing from the scope and spirit of this disclosure.

Controller 125 preferably includes at least one ASIC ("Application Specific Integrated Circuit") that is specially designed for performing the read and write operations on volatile memory 115 and solid-state non-volatile memory 135. For example, controller 125 may use DMA controller 142 for transferring cached data directly from volatile memory 115 to solid-state non-volatile memory 135 and for managing read and write functions performed on solid-state non-volatile memory 115.

Volatile memory 115 may be implemented using DRAM or any type of solid-state memory that is suitable for use as cache memory. Static RAM (SRAM) may also be used, in lieu of or in conjunction, with DRAM. Solid-state non-volatile memory 135 may be implemented using flash memory, EEPROM ("Electrically Erasable Programmable Read-Only Memory"), or any other type of solid-state erasable/programmable devices and re-programmable non-volatile memory device. A solid-state device is defined as any device that uses semiconductor integrated circuits and/or electronic discrete components that are commonly associated with such integrated circuits. In addition, controller 125 may be configured to perform memory related file system calls using any suitable caching algorithm that is known by one of ordinary skill in the art. Controller 125 is also responsible for handling the directory structures for data stored within solid-state non-volatile memory 135.

Figure 2:
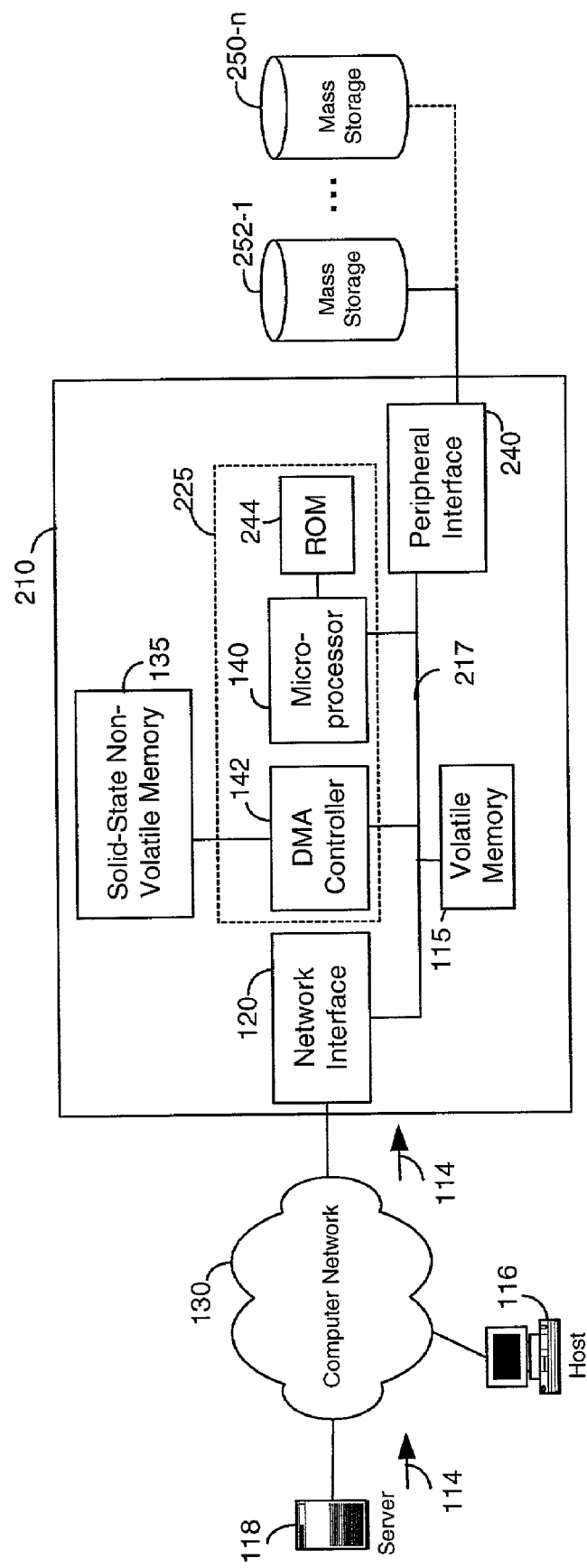
FIG. 2 is a block diagram of a network storage device having non-volatile memory and a peripheral interface for coupling to at least one disk drive in accordance with another embodiment of the present invention.

FIG. 2 is a block diagram of a network storage device 210 having solid-state non-volatile memory 135 and a peripheral interface 240 for coupling to at least one disk drive in accordance with another embodiment of the present invention. Storage device 210 is similar to storage device 110 since it includes a network interface 120 and runs a file system, permitting it to operate as a network-addressable storage device when coupled to a computer network 130. Host 116 may send or retrieve data from storage device 210 by using network protocols to transmit file system calls and associated data between itself and storage device 210. Upon receipt of the file system calls, network storage device 210 processes the file system calls using an embedded file system. Unlike storage device 110, storage device 220 also includes a peripheral interface 240 for coupling controller 225 via data path 217 to at least one mass storage device. This enables storage device 210 to function as a network-addressable storage device that uses volatile memory 115 and solid-state non-volatile memory 135 as hierarchical caches to any attached mass storage device, such as disk drives 252-0 and/or 252-n. Data path 217 is similar to data path 117, except for the additional connection to peripheral interface 240.

Controller 225 is configured to function as an embedded file system and memory controller for solid-state non-volatile memory 135 and volatile memory 115. Its functions include communicating with network interface 120 and peripheral interface 240, and controlling the caching operations of volatile memory 115 and solid-state non-volatile memory 135. To carry out these functions, controller 225 includes a processor and a memory controller, such as microprocessor 140 and DMA controller 142, which are both coupled to data path 217. DMA controller 142 is also coupled to solid-state non-volatile memory 135, and ROM 244 is coupled to microprocessor 140. ROM 344 is programmed with appropriate microprocessor code that causes controller 25 to operate as a network addressable storage device. ROM 344 is also programmed with microprocessor code so that controller 225 uses volatile memory 115 as a cache for solid-state non-volatile memory 135 when responding to file system calls forwarded by network interface 120 via data path 217.

Since storage device 210 includes a peripheral interface 240, ROM 244 also includes a device driver that is suitable for forwarding block-level I/O requests, such as a write or read request, to disk drives 252-0 through 252-n. The block-level requests are generated by controller 225 using its embedded file system, which includes a file manager for converting the file system call into at least one block-level request. The file manager processes the block-level request according to the type of device managed by the file manager, which in this example is peripheral interface 240 having disk drives 250-0 through 250-n.

Controller 225, unlike controller 125 uses volatile memory 115 and solid-state non-volatile memory 135 as caches to disk drives 252-0 through 252-n, resulting in a multi-level cache memory system. For instance, volatile memory 115 may be used at a cache level above state non-volatile memory 135, while disk drives 252-0 and/or 252-n are used as mass storage. When a read request is received from computer network 130, network storage device 210 will attempt to retrieve the requested data from volatile memory 115. If the requested data cannot be found in volatile memory 115, network storage device 210 will attempt to retrieve the data from solid-state non-volatile memory 135. If the requested data cannot be found in solid-state non-volatile memory 135, network storage device 210 will then attempt to retrieve the requested data from disk drives 252-0 through 252-n. Techniques for implementing multi-level cache systems are well known in the art, and are therefore not described herein in order to avoid obscuring the aspects or limiting the scope of the present invention.

Network interface 120 is configured for coupling controller 225 to computer network 130 and is similar in operation to network interface 110, as described above. Thus, network interface 120 receives file system calls or transmits responses to same in the form of network data packets across computer network 130. For example, if network interface 120 receives a set of network data packets encapsulating a file system call in the form of a read request, it transmits the read request to controller 225 across data path 217 after obtaining the read request from the network data packets received. Upon receiving a file system read request, controller 225 provides file system functionality by translating the read request into hardware specific tasks such that the appropriate blocks of data corresponding to the file are read from volatile memory 115 if there is a cache hit. If so, the requested data is retrieved and sent to the device that sent the read request via data path 217, network interface 120 and computer network 130. If a cache miss occurs, controller 225 determines whether any of the requested blocks are in solid-state non-volatile memory 135. If so, it reads the blocks from solid-state non-volatile memory 135, updates volatile memory 115, and sends the data to the requesting device through the path just described above. If a device transmits a file system call in the form of a write operation and addresses the file system call to storage device 210, then upon receiving the write request from network interface 120, microprocessor 140 writes the blocks of data corresponding to the write request in volatile memory 115. DMA controller 142 will subsequently write the data to solid-state non-volatile memory 135.

Peripheral interface 240 is preferably a SCSI ("Small Computer Systems Interface") Host Bust Adapter having a SCSI bus 250 that is coupled to at least one mass storage device, such as disk drives 252-0 through 252-n. In this implementation, controller 225 uses a SCSI device driver that is suitable for use with a SCSI host bust adapter. Those of ordinary skill in the art will readily recognize that this implementation is not intended to limit the invention in any way. Peripheral interface 240 may be any interface that is capable of supporting block-level I/O transfers between storage device 210 and any mass storage device coupled to peripheral interface 240.

For example, peripheral interface controller 240 may be a RAID ("Redundant Array of Identical Disks") controller (not shown) having the capability to store data across more than one mass storage device and other features commonly associated with RAID controllers. In other embodiments, peripheral interface 240 may be implemented using an IDE/ATA (Integrated Device Electronics/AT Attachment), PIO (Programmed Input/Output), DMA (Direct Memory Access), or equivalent device interface. In addition, the mass storage devices used may be disk drives, disk arrays, high-capacity flash-memory, or even another network storage device that has an interface suitable for use with peripheral interface 240.

Figure 3:
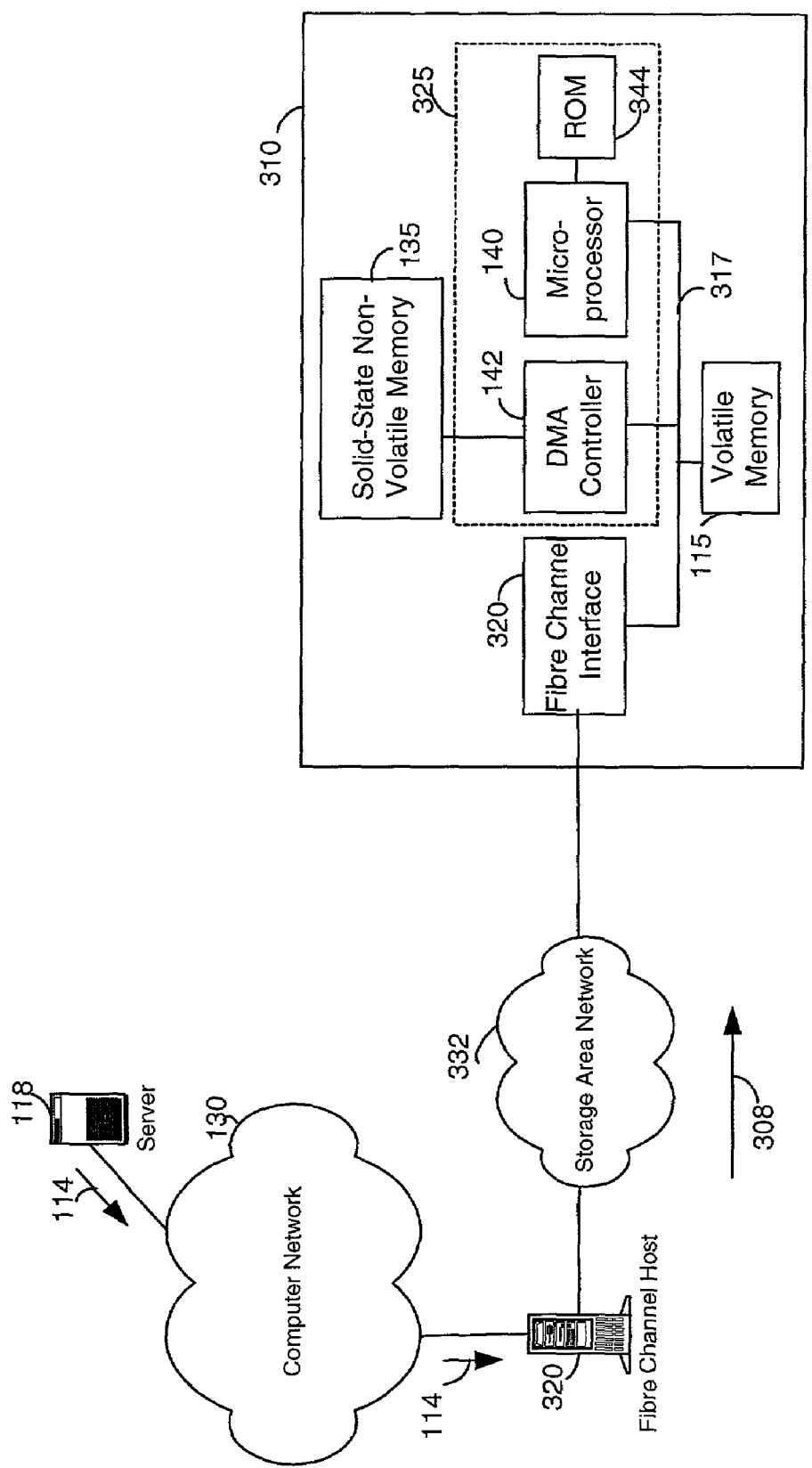
FIG. 3 is a block diagram of a network storage device having a Fibre Channel interface and a solid-state non-volatile memory for use as mass storage in accordance with yet another embodiment of the present invention.

FIG. 3 is a block diagram illustrating a network storage device 310 suitable for use with a Fibre Channel network in accordance with yet another embodiment of the present invention. Storage device 310 includes a volatile memory 115, Fiber Channel interface 320, solid-state non-volatile memory 135, a controller 325, and a data path 317, which enable storage device 310 to process block-level I/O requests sent to it by host 320 across storage area network 332 using the Fibre Channel Protocol. Controller 325 includes a processor and a memory controller, such as microprocessor 140 and DMA controller 142, which are both coupled to data path 317. DMA controller 142 is also coupled to solid-state non-volatile memory 135, and ROM 344 is coupled to microprocessor 140. ROM 344 is programmed with appropriate microprocessor code that enables controller 325 to operate storage device 310 as a Fibre Channel storage device. ROM 344 is also programmed with microprocessor code so that controller 325 uses volatile memory 115 as a cache to solid-state non-volatile memory 135 when responding to block-level I/O requests forwarded by Fibre Channel interface 320 via data path 317 when the requests are received from storage area network 332.

The Fibre Channel protocol is known to one of ordinary skill in the art and is intended for use with an architecture that defines the standards for implementing a multi-layered networking architecture for moving data across a network. The multi-layered networking architecture includes five layers, commonly referred to as FC-0 to FC-4, inclusive. The FC-0 layer defines the physical medium, which may be optical or electrical. The FC-1 layer defines the encoding and decoding of data selected for transmission across the network and link control. The FC-2 layer defines data delivery functions of the network, including framing, flow control, and service class. The FC-3 layer is for defining common services. The FC-4 layer defines the upper-layer protocol interface and includes the serial SCSI-3 protocol, which is known to one of ordinary skill in the art.

Host 320 includes a Fibre Channel Host Bus Adapter (not shown) coupled to storage area network 332 and a network interface (not shown) for coupling to a network, such as computer network 130. Host 320 also includes software that enables it to function as a Fibre Channel host for any Fibre Channel compliant storage device coupled to a storage area network, such as storage device 310. Consequently, host 320 can receive and process file system calls sent by another device, such as server 118 or workstation 316 (not shown), that is directly or ultimately coupled to host 320. For example, host 320 may be loaded with an operating system having a file system, such as NFS or CIFS, a volume manager, and a device driver that complies with the protocol defined by the FC-4 layer, such as a device driver complaint with the serial SCSI-3 protocol.

Upon receipt of the file system call from server 118, Fibre Channel host 320 passes the call to the operating system, which in turn, uses its file system to convert the call into at least one block-level I/O request. The file manager then processes the block-level request according to the type of device it manages, which in this example, is a Fibre Channel Host Bus Adapter, and passes the block level request to the device driver. Upon receiving the block-level request, the device driver manages the transfer of the requested blocks to the targeted storage device. If the block-level blocks are targeted for storage device 310, host 320 sends at least one block I/O request 308 across storage area network 332 using the protocol defined for the FC-4 layer. In this embodiment, the serial SCSI-3 protocol is used to define the transmission of block I/O request 308. Those of ordinary skill in the art will recognize that this may be accomplished by using the Fibre Channel protocol to transform or map commands and operations, such as block-level request 308, to the serial SCSI-3 protocol over storage area network 332.

Storage device 310 receives block-level I/O request 308 via Fibre Channel interface 320 and processes the request. If block-level I/O request 308 is a block read request, it is translated by controller 325 into hardware specific tasks so that blocks of data corresponding to block-level I/O request are read from volatile memory 115, if there is a cache hit. If so, the requested data is retrieved and returned to host 320 through data path 317, Fibre Channel interface 320 and storage area network 332. If a cache miss occurs, then controller 325 performs a read operation on solid-state non-volatile memory 135, updates volatile memory 115, and sends the data to host 320 through the path just described above. If host 320 transmits a block-level I/O write request and addresses the request to storage device 310, then upon receiving the block-level I/O write request from Fibre Channel interface 320, controller 325 writes the data in volatile memory 115. Controller 325 will subsequently write the data to solid-state non-volatile memory 135.

Controller 325 is similar to controllers 125 and 225 since it uses a processor and memory controller, such as microprocessor 140 and Direct Memory Access (DMA) controller (DMC) 142, respectively. DMA controller 142 is coupled to data path 317 and to solid-state non-volatile memory 135, and microprocessor 140 is coupled to ROM 344. However, controller 325 differs from controllers 125 and 225 in operation since ROM 344 stores codes and instructions for causing microprocessor 140 to execute functions associated with block-level I/O requests, such as those commonly associated with the Fibre Channel protocol. This enables controller 325 to provide Fibre Channel storage functionality to storage device 310.

Data path 317 may be a bus, embedded network, or equivalent that will permit components coupled to it to communicate with each other. In the embodiment shown in FIG. 3, data path 317 is a bus compliant with the PCI (Peripheral Component Interconnect), version 2.1 standard although this is not intended to be limiting in any way. Fibre Channel interface 320 includes Fibre Channel ports suitable for physically and logically coupling to a Fibre Channel network, such as storage area network 332. The type and number of ports used is dependant on the topology of storage area network 332. The implementation of Fibre Channel ports and network topologies, which may include point-to-point, loop, or switched topologies, are well known to those of ordinary skill in the art and are not further discussed to avoid over-complicating the herein disclosure. Fibre Channel interface 320 is also configured to communicate with controller 325 through data path 317 in accordance with the PCI standard. In addition, although only storage device 310 is shown on storage area network 332, additional storage devices and Fibre Channel hosts may be coupled to network 332 but are not shown to avoid over-complication FIG. 3.

In the present embodiment, controller 325 preferably includes at least one ASIC ("Application Specific Integrated Circuit") that is specially designed for performing read and write operations on volatile memory 115 and solid-state non-volatile memory 135 according to any caching algorithm known to one of ordinary skill in the art. Controller 325 is also responsible for handling the directory structures for data stored within solid-state non-volatile memory 135.

Figure 4:
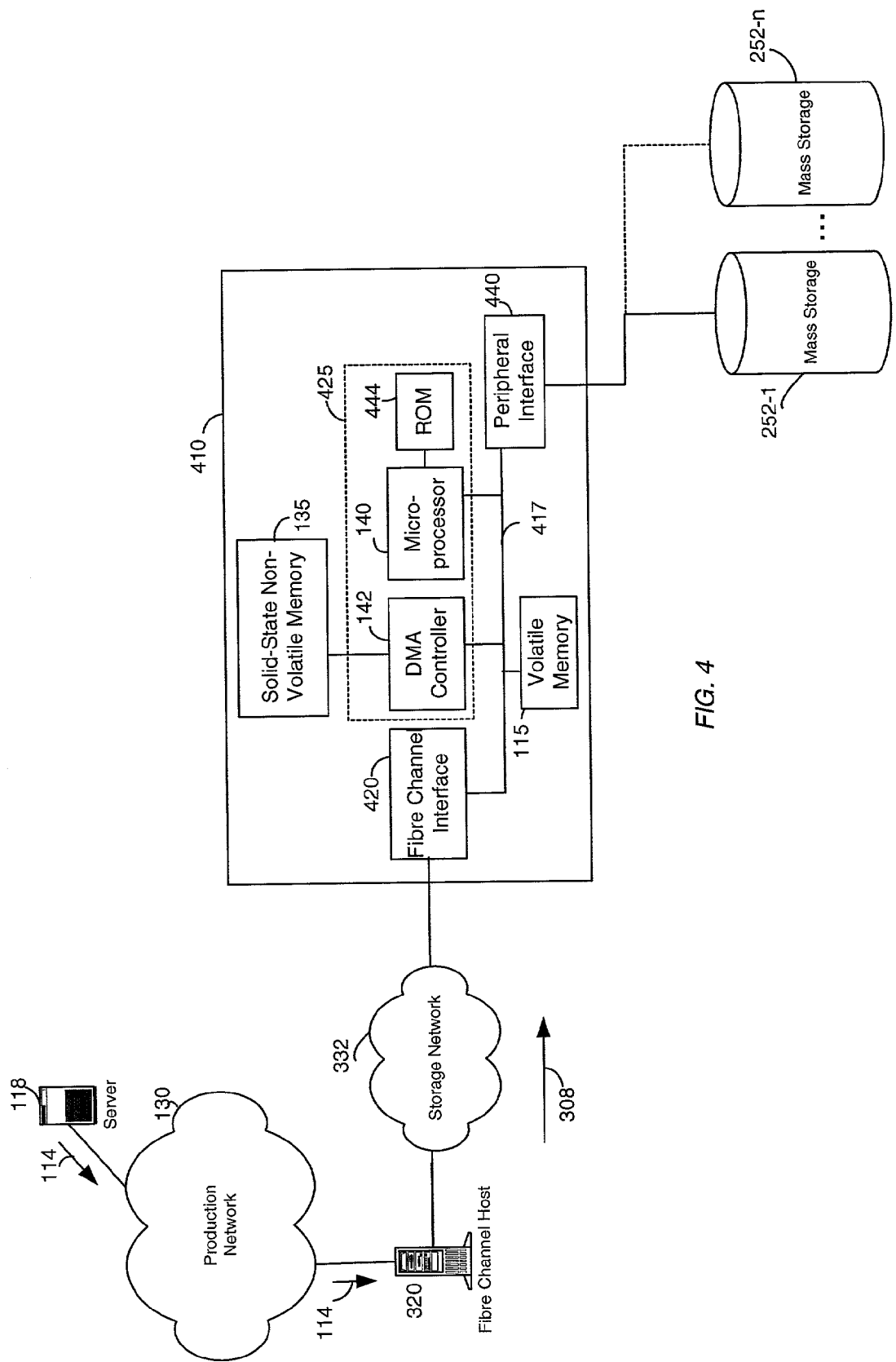
FIG. 4 is a block diagram of a network storage device having a Fibre Channel interface, a solid-state non-volatile memory, and a peripheral interface for coupling to mass storage devices, in accordance with yet another embodiment of the present invention.

FIG. 4 is a block diagram of a network storage device having an interface, such as Fibre Channel interface 320, for coupling to a storage area network 332, a solid-state non-volatile memory 135, and a peripheral interface 240 for coupling to mass storage devices, in accordance with yet another embodiment of the present invention. Storage device 410 also includes volatile memory 115, a controller 425, and a data path 417. Data path 417 is similar to data path 317, except for the additional connection to peripheral interface 440, as shown.

Storage device 410 operates in a similar manner to storage device 310 in that it receives to block-level I/O requests using Fibre Channel interface 320, which are sent to it over a storage network, such as storage area network 332. When a block-level I/O request is received by Fibre Channel interface 320, it forwards the request to controller 425 in a format suitable for transmission across data path 417. Unlike storage device 310, however, storage device 410 also includes a peripheral interface, such as peripheral interface 240, and a device driver. The peripheral interface and device operate to physically and logically couple controller 425 via data path 417 to at least one mass storage device, enabling the block-level I/O requests to be processed according to the particular configuration of the mass storage devices used. The device driver used is suitable for forwarding block-level I/O requests, such as a write or read request, from controller 425 to disk drives 252-0 through 252-n using peripheral interface 240.

Storage device 410 uses the mass storage devices as its storage medium, while using volatile memory 115 and solid-state non-volatile memory 135 as multilevel caches. For instance, volatile memory 115 may be used at a cache level above solid-state non-volatile memory 135, while disk drives 252-0 and/or 252-n are used as mass storage. This permits storage device 410 to operate as a "network cache"

for block-level I/O requests that it receives and that are targeted for mass storage devices 252-0-252-n. This can provide significant performance improvement over conventional hard-disk based storage systems, because access time of solid-state memory is generally faster than that of conventional disk drives.

Controller 425 processes block-level I/O requests sent to it by Fibre Channel interface 320, and controls the caching operations of volatile memory 115 and solid-state non-volatile memory 135. In the present embodiment, controller 425 includes a processor and a memory controller, such as microprocessor 140 and DMA controller (DMC) 142, which are coupled to data path 417. DMA controller 142 is also coupled to solid-state non-volatile memory 135 and controls the transfer of data between volatile memory 115, solid-state non-volatile memory 135, and/or mass storage devices 252-0 through 252-n via peripheral interface 140. Preferably, Fibre Channel interface 320 and DMA controller 342 are implemented using ASIC technology, rendering storage device 310 suitable for implementation in a form and size that are similar to magnetic disk drives having a form factor of three and half inches or less.

When a block-level read request is received from storage area network 332, network storage device 410 first attempts to retrieve the requested data from volatile memory 115. If the requested data is not found in volatile memory 115, i.e., a cache miss occurred, storage device 410 attempts to retrieve the data from solid-state non-volatile memory 135. If the requested data is not found in solid-state non-volatile memory 135, storage device 410 then retrieves the requested data from mass storage device 252-0–252-n. Techniques for implementing multilevel cache systems are known to one of ordinary skill in the art, and are therefore not described herein in order to avoid obscuring the aspects or limiting the scope of the present invention.

Figure 5:
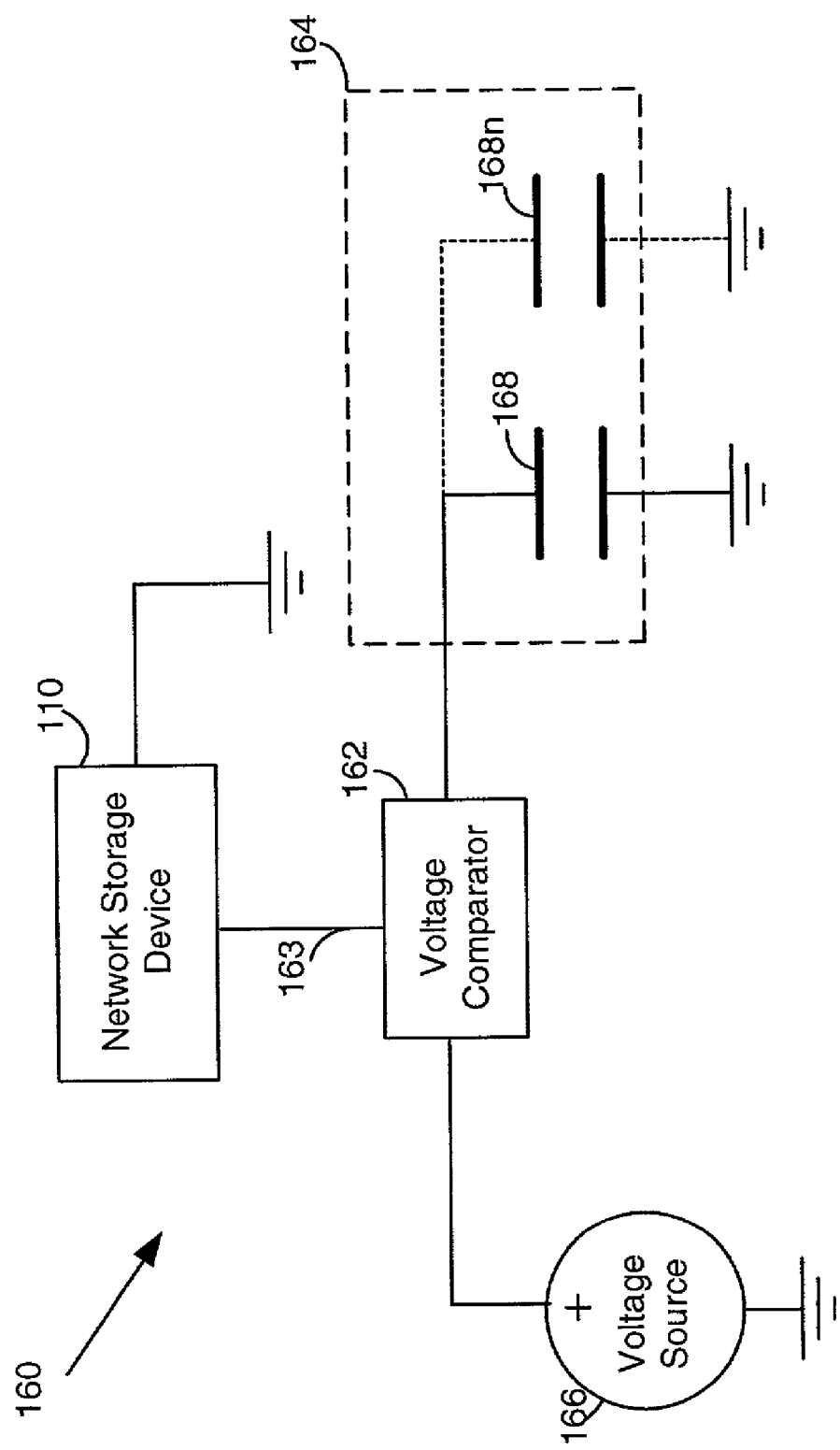
FIG. 5 is a block diagram of a power supply having an auxiliary power source for use with a storage device in accordance with another embodiment of the present invention.

FIG. 5 is a block diagram of one embodiment of a power supply 160 that may be used with the various embodiments of a network storage device, such as storage device 110 shown above. Power supply 160 includes a voltage comparator 162 having an output 163, an auxiliary power source 164, and a primary power source 166. In this embodiment, auxiliary power source 164 is comprised of at least one capacitor 168, which is of a sufficient rating to support the flushing of data from volatile memory 115 to solid-state non-volatile memory 135 if the network storage device loses power from primary power source 166. Output 163 provides positive voltage to network storage device 110.

In operation, voltage comparator 162 compares the voltage provided by primary power source 166 (primary voltage) with a selected threshold and if the primary voltage is above the selected threshold, it uses the primary voltage as its output voltage at output 163. Otherwise, if the primary voltage falls below the threshold, voltage comparator 162 uses the voltage provided by auxiliary power source 164 (auxiliary voltage) as its output voltage at output 163. The primary voltage should be sufficient to ensure the normal operation of the network storage device. In addition, the auxiliary voltage should be sufficient to ensure that the network storage device can properly flush data stored in volatile memory 115 to solid-state non-volatile memory 135. Further, the selected threshold of comparator 162 should be at a voltage level that will trigger comparator 162 to switch to auxiliary power source 164 if the primary voltage drops below the selected threshold. Additional capacitors 168n may be also used to properly scale auxiliary power source 164 to the voltage and power demands of the network storage device so that sufficient voltage and power may be provided to ensure that volatile memory 115 is properly flushed to solid-state non-volatile memory 135.

In a conventional network storage device where a large amount of data is stored in DRAMs, a significant amount of time is needed to copy all the data to a disk drive each time the device is powered-down. In contrast, the network storage device of the present embodiment does not need to copy the data stored in solid-state non-volatile memory 135 to a backup disk drive since it can retain its data without using any power to refresh the stored data. Because the network storage device uses volatile memory 115 for caching, there may be times when volatile memory 115 must be flushed to solid-state non-volatile memory 135, such as when primary power is unexpectedly lost and volatile memory 115 contains dirty cache data. Since solid-state non-volatile memory 135 does not suffer from the internal latencies, such as positional latency encountered in disk drives, data may be transferred from volatile to non-volatile memory using an average sustained data transfer rate greater than that available in disk drives. As a result, the network storage device does not suffer from the same disadvantages related to flushing as a storage device that uses DRAM as its storage medium and a back-up disk drive.

Moreover, because solid-state non-volatile memory 135 consumes little power and current when written to, sufficient power for flushing volatile memory 115 can be provided using a power source comprised of capacitors rather than lead acid batteries commonly found in typical uninterruptible power supplies. This permits the network storage device to be offered with an embedded power supply 160 having an auxiliary power source in a physical package that complies with a disk drive form factor commonly seen in stand-alone disk drives, such as a form factor of three and half inches.

In addition, the various embodiments of the network storage devices disclosed above may also be configured with a UPS (not shown) either in lieu of or in conjunction with power supply 160, to provide standby power in the event that network storage device needs to remain operational for a fixed number of time after primary power is lost.

The present invention, a network storage device having solid-state non-volatile memory as storage medium, has thus been described. While the present invention has been described in particular embodiments, it should be appreciated that the present invention should not be construed as limited by such embodiments. Rather, the present invention should be construed according to the claims below.

What is claimed is:

1. A network storage device for a computer network, said device comprising:
    a network interface configured for receiving a file system call via the computer network;
    a solid-state non-volatile memory;
    a controller coupled to said network interface and said solid-state non-volatile memory;
    a power supply having an energy store comprising entirely of capacitors;
    wherein said controller is configured for receiving said file system call from said network interface and for processing said file system call, and said solid-state non-volatile memory is configured for storing data associated with the file system call when requested by said controller; and
    wherein said controller is configured to read from said at least one mass storage device if said file system call corresponds to a read request and if said solid-state non-volatile memory does not contain the data corresponding to the read request.

2. The network storage device in claim 1, wherein said controller is configured to include an embedded file system.

3. The network storage device in claim 2, wherein said power supply, said peripheral interface, said solid-state non-volatile memory, said volatile memory, said controller, said embedded file system, and said network interface are integrated into a form and size equivalent to a disk drive form factor of approximately three and a half inches or less.

4. A network storage device for a storage area work, said device comprising:
- a Fibre Channel interface configured for receiving a block-level I/O request via the storage area network;
- a solid-state non-volatile memory;
- a controller coupled to said network interface and said solid-state non-volatile memory;
- a volatile memory coupled to said controller and for caching said data before said data is written to said solid-state non-volatile memory;
- a peripheral interface coupled to said controller and configured for coupling to at least one mass storage device;
- a power supply having an energy store comprising entirely of capacitors;
- wherein said controller is configured for receiving said block-level I/O request from said Fibre Channel interface and for processing said block-level I/O request, and said solid-state non-volatile memory is configured for storing data associated with the block-level I/O request when requested by said controller; and
- wherein said controller is configured to read from said at least one mass storage device if said block-level I/O request corresponds to a read request and if said solid-state non-volatile memory does not contain the data corresponding to the read request.

5. The network storage device in claim 4, wherein said power supply, said peripheral interface, said solid-state non-volatile memory, said volatile memory, said controller, and said Fibre Channel interface are integrated into a form and size equivalent to a disk drive form factor of approximately three and a half inches or less.

* * * * *